United States Patent [19]
Co et al.

[11] Patent Number: 5,491,729
[45] Date of Patent: Feb. 13, 1996

[54] DIGITAL PHASE-LOCKED DATA RECOVERY CIRCUIT

[75] Inventors: Ramon S. Co, Milpitas; Ron Kao, San Jose, both of Calif.

[73] Assignee: 3Com Corporation, Santa Clara, Calif.

[21] Appl. No.: 337,965

[22] Filed: Nov. 14, 1994

Related U.S. Application Data

[63] Continuation of Ser. No. 909,569, Jul. 6, 1992, abandoned.

[51] Int. Cl.$^6$ ................................................. H03D 3/24
[52] U.S. Cl. ................................................. 375/376; 375/371
[58] Field of Search ................................. 375/376, 375, 375/374, 373, 372, 371, 354, 355, 333, 329, 279, 282

[56] References Cited

U.S. PATENT DOCUMENTS

| | | | |
|---|---|---|---|
| 4,584,695 | 4/1986 | Wong et al. | 375/120 |
| 4,821,296 | 4/1989 | Cordell | 375/119 |
| 4,821,297 | 4/1989 | Bergmann et al. | 375/120 |
| 4,965,884 | 10/1990 | Okura et al. | 375/119 |
| 5,073,905 | 12/1991 | Dapper et al. | 375/106 |

*Primary Examiner*—Stephen Chin
*Assistant Examiner*—Hai H. Phan
*Attorney, Agent, or Firm*—Benman Collins & Sawyer

[57] ABSTRACT

A digital phase-locked data recovery circuit having improved noise immunity. The data recovery circuit includes a multi-phase clock for supplying clock signals having a predetermined relative phase relationship. A snap shot sampling network takes samples of an input data signal in response to the multi-phase clock signals. The samples are preferably collected during the duration of boundary sampling windows encompassing transitions in the input data signal. The present invention further includes a network for comparing the received data samples with a sample pattern. A phase encoder then generates error signals in response to the phase comparisons. A phase decoder adjusts the phase of the boundary window in response to the error signal.

13 Claims, 13 Drawing Sheets

DIGITAL PHASE-LOCKED DATA RECOVERY CIRCUIT

This is a continuation of copending application(s) Ser. No. 07/909,569 filed on Jul. 6, 1992 abandoned.

BACKGROUND OF THE INVENTION

1. Field of the Invention

The present invention relates to the recovery of clock timing information from data transmitted within digital systems. More specifically, this invention relates to phase-locked methods of synchronizing the phase of a locally-generated receiver clock with that of the transmitted waveform.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

The interest in local-area networks is steadily increasing. Local area networks facilitate economical data communication between computing systems clustered in a locality. Examples of such networks used widely in the art include token ring LAN's and Ethernet LAN's.

A token ring LAN is a circular network having a plurality of stations (nodes) interconnected in a ring topology. Access to the network is controlled by the possession of a signal "token". The token is a packet of signals that is passed from node to node. The node that has the token has control of the network with respect to the transmission of data to other nodes and the receipt of data from the same. When the node has completed a transmission, the token is released for acquisition by another node.

Errors in data transmission within the ring can generally be minimized by operating the ring in a synchronous mode. That is, in order to decode a baseband data waveform a clock signal giving the proper sampling time must be available. Pilot tones are sometimes transmitted along with the data waveform for this purpose. Alternatively, timing may be derived directly from the data waveform itself. One approach to such "self-timing" involves allowing the data to pass through a memoryless nonlinearity and then ring a tuned circuit with a resonant frequency close to the nominal data (bit) rate. Nonetheless, this approach is relatively imprecise in comparison with those which utilize phase-locked loops (PLL's).

The efficacy of PLL's employed in LAN's with regard to the extraction of a clock frequency from a data waveform depends in part upon the transmission code selected. In this regard the Manchester code is often favored within LAN's as allowing for relatively simple clock extraction. A Manchester encoded waveform may be synthesized by combining a binary data pattern with a transmitter clock operative at twice the transmitted bit frequency. Thus, a transition corresponding to a transmitter clock signal occurs at every midbit interval of a Manchester data bit irrespective of the specific data pattern. Clock synchronization within a receiver is initially effected by transmitting a preamble consisting of a Manchester encoded waveform having no steps at bit boundaries. This allows individually received data bits to be distinguished, thus obviating the need for a separately transmitted clock signal.

The receiver decodes the Manchester data by sampling each received data bit at several time intervals. The receiver clock must remain sufficiently matched to the transmitter clock or samples may be taken on the "wrong" side of the midbit transition. For example, if sampling is to occur within one-fourth bit of the transmitted clock edges the receiver clock must be matched within twenty-five percent of the transmitted clock. Otherwise, samples will be taken from outside the bit boundaries or on the wrong side of the mid-bit steps. Thus, with a 10 MHz clock signal (each bit is 100 nanoseconds long) the phase of the receiver clock must be matched to within 25 nanoseconds of the phase of the transmitter clock in order to ensure accurate decoding.

A conventional PLL receiver network remains in timing synchronization by adjusting its clock phase relative to transitions within the transmitted data. In high-speed analog PLL's, the transmitted and recovered clock signals are provided to a comparator. The comparator produces an error voltage in response to a phase difference between the clock signals. The error voltage is then filtered and applied to a voltage controlled oscillator (VCO) for synthesizing the recovered clock waveform.

Although analog PLL's offer potentially high resolution, the need for precision circuit components may unacceptably increase costs. Moreover, the susceptibility of analog circuits to signal noise tends to limit the resolution effectively obtained in practical applications.

In contrast, digital PLL circuits do not require precision circuit elements. Nonetheless, the resolution of a digital PLL is constrained by the number of samples which may be taken during each bit period. Digital PLL's typically employ a counter which is incremented during each cycle of the recovered clock. Upon reaching a predetermined value, the counter issues a sample clock pulse to be compared with the received clock signals. In general, if the sample pulses lead the received clock a pulse is deleted from the pulse stream feeding the counter in order to delay the count. Alternatively, the limit of the counter may be incremented by one in order to obviate the need to delete a pulse as a means of delaying issuance of the next sample pulse. Similarly, if the sample clock signals lag the received clock an additional pulse is supplied by a driver clock to the counter pulse stream.

Unfortunately, this operational mode requires that the pulse stream provided to the counter be modified at a relatively high rate. For example, in order to extract 32 bits per sample from a 10 Mbps data signal the driver clock would need to operate at approximately 320 MHz. Because of the difficulty in generating a sampling clock signal of 320 MHz, digital PLL decoding techniques using a single driver clock are of limited utility in high frequency applications.

At least one technique has been proposed which purports to overcome the constraints on sampling intervals imposed by the requirement of a high frequency clock driver. Specifically, U.S. Pat. No. 4,584,695 issued to Wong, et al. on Apr. 22, 1986, which is herein incorporated by reference, describes a digital PLL technique which ostensibly provides an effective sampling interval and resolution shorter than the period of a driver clock. A multi-phase driver clock provides clock signals phase-offset from each other. One clock output signal is used as the driver clock to clock an input sampler. A pattern of bit samples before, nominally at, and after a predicted clock edge indicates whether a leading or lagging phase should be substituted for the present driver clock signal.

However, the multiphase technique disclosed by Wong, et al. does not furnish information regarding the magnitude of the lead/lag error. The absence of such information may introduce, for example, jitter in the recovered clock signal. Indeed, in general, multi-phase techniques disposed to reflexively add or subtract from the counter pulse stream tend to unnecessarily introduce jitter into the recovered clock waveform. That is, corrections are made for transient phase deviations induced by spurious noise as well as for "true" drift of the recovered clock.

In addition, conventional multi-phase sampling methods may be susceptible to signal noise. For example, in the typical multi-phase systems, the encoded waveform is generally sampled uniformly throughout each bit period. Thus, in the case of Manchester waveforms there is the possibility that a transition at a bit boundary will be mistaken for a midbit transition resulting from a noise-induced phase shift of the data signal.

Hence, a need in the art exists for a digital PLL timing recovery technique having decreased susceptibility to signal noise.

SUMMARY OF THE INVENTION

The need in the art for a digital PLL timing recovery network having improved noise immunity is addressed by the digital phase-locked data recovery circuit of the present invention. The inventive data recovery circuit includes a multi-phase clock for supplying clock signals having a predetermined relative phase relationship. A snap shot sampling network takes samples of an input data signal in response to the multi-phase clock signals. The samples are collected during boundary sampling windows encompassing transitions in the input data signal. In a particular implementation, the invention further includes a network for comparing the received data samples with a sample pattern. A phase encoder then generates error signals in response to the phase comparisons. A phase decoder adjusts the phase of the boundary window in response to the error signal.

DETAILED DESCRIPTION OF THE INVENTION

Figure 1:
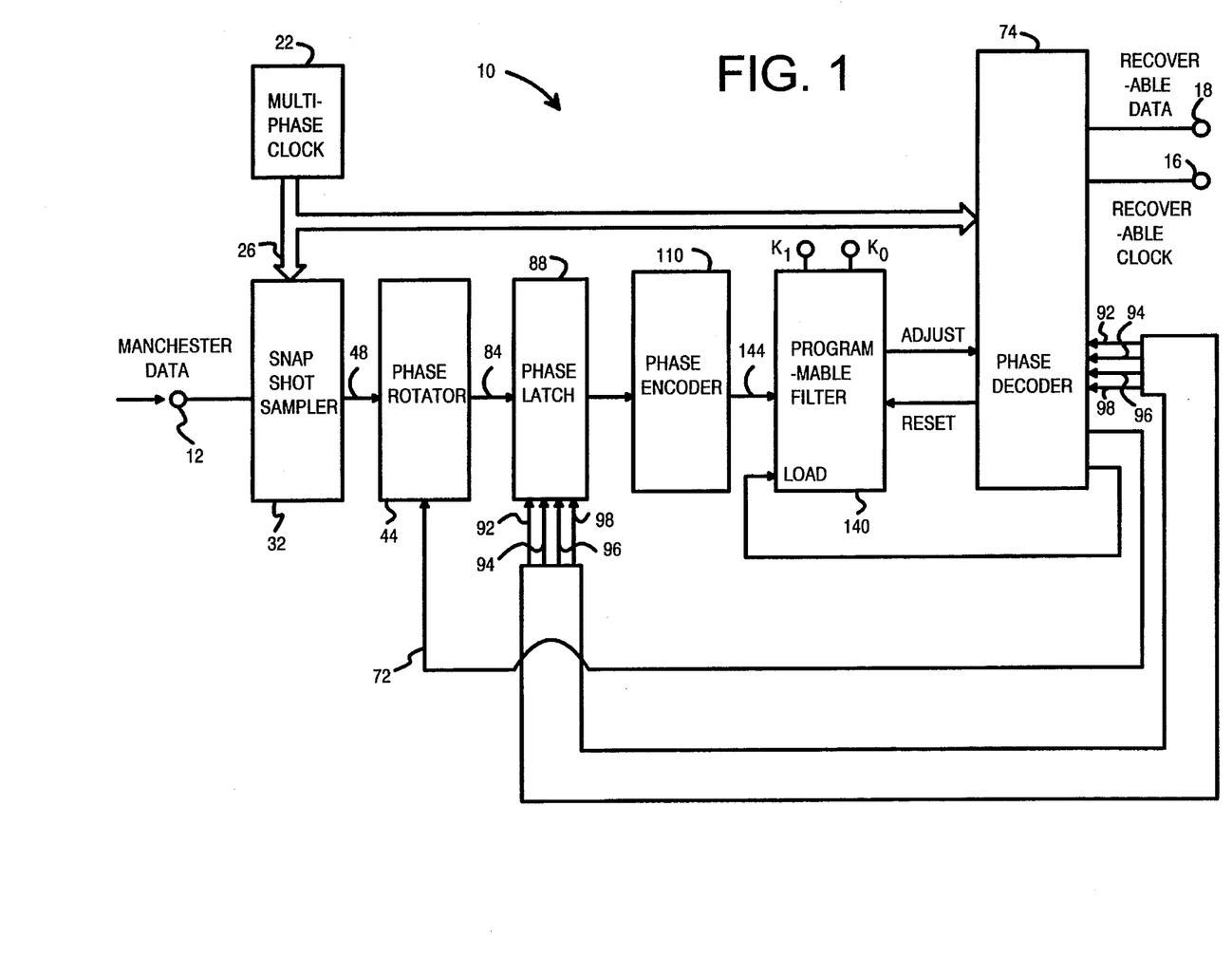
FIG. 1 is a block diagram of a preferred embodiment of the digital phase-locked data recovery circuit of the present invention

FIG. 1 is a block diagram of a preferred embodiment of the digital phase-locked data recovery circuit 10 of the present invention. The inventive circuit 10 receives Manchester encoded data at an input line 12, and operates to recover therefrom clock and data waveforms at output terminals 16 and 18.

Figure 2:
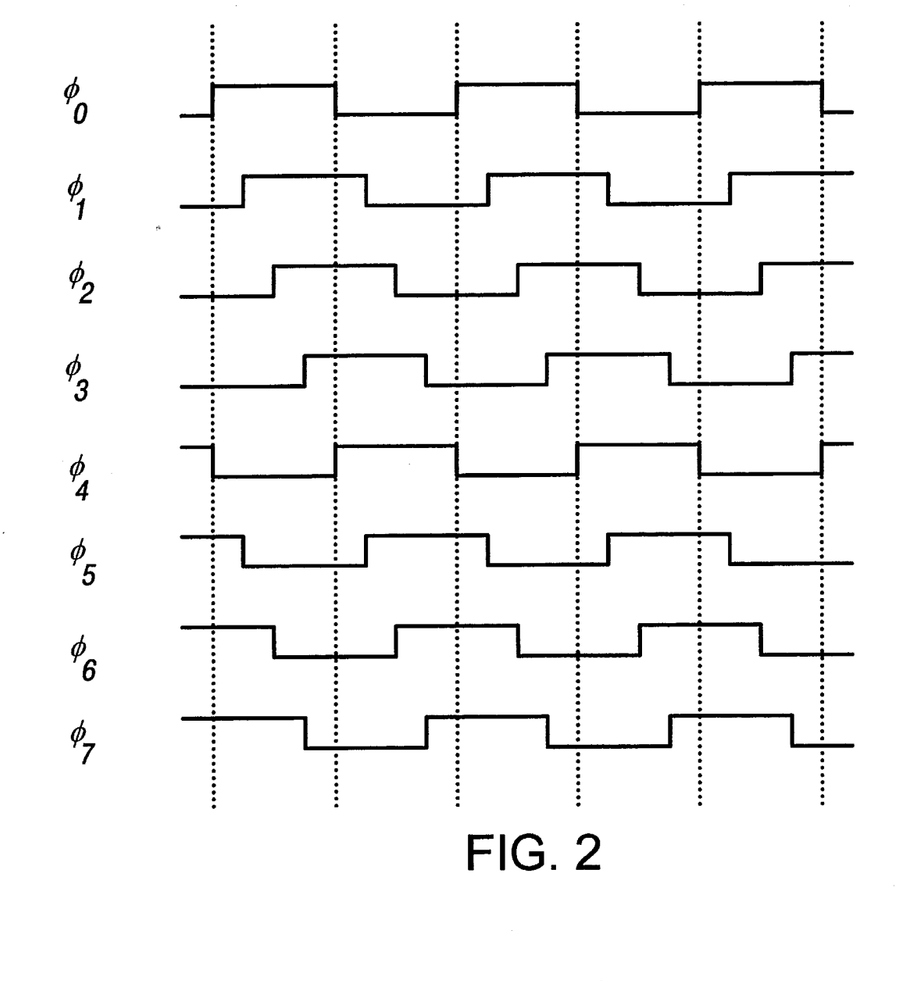
FIG. 2 shows the relative phase relationship of the eight clock phases 40, 41, 42, 43, 44, 45, 46, and 47 provided by a multi-phase clock.

As shown in FIG. 1, a multi-phase clock 22 provides a set of clock signals equally spaced in phase upon a set of clock driver lines 26. In the preferred embodiment of FIG. 1, the multi-phase clock 22 generates eight 40 MHz clock signals frequency-locked to a 20 MHz crystal oscillator (not shown). More specifically, FIG. 2 shows the uniform relative phase relationship of the eight clock phases $\phi_0$, $\phi_1$, $\phi_2$, $\phi_3$, $\phi_4$, $\phi_5$, $\phi_6$, $\phi_7$. The clock 22 may be realized as described in copending U.S. patent application Ser. No. 07/879,960 filed on May 28, 1992, entitled "MULTI-PHASE CLOCK GENERATOR AND MULTIPLIER", which is incorporated herein by reference. In addition, aforementioned U.S. Pat. No. 4,584,695 to Wong discloses a multi-phase clock generator 22. Samples of the input Manchester data are clocked into a snap-shot sampler 32 using the eight phases $\phi_0$, $\phi_1$, $\phi_2$, $\phi_3$, $\phi_4$, $\phi_5$, $\phi_6$, $\phi_7$ of the multi-phase clock 22.

Figure 3:
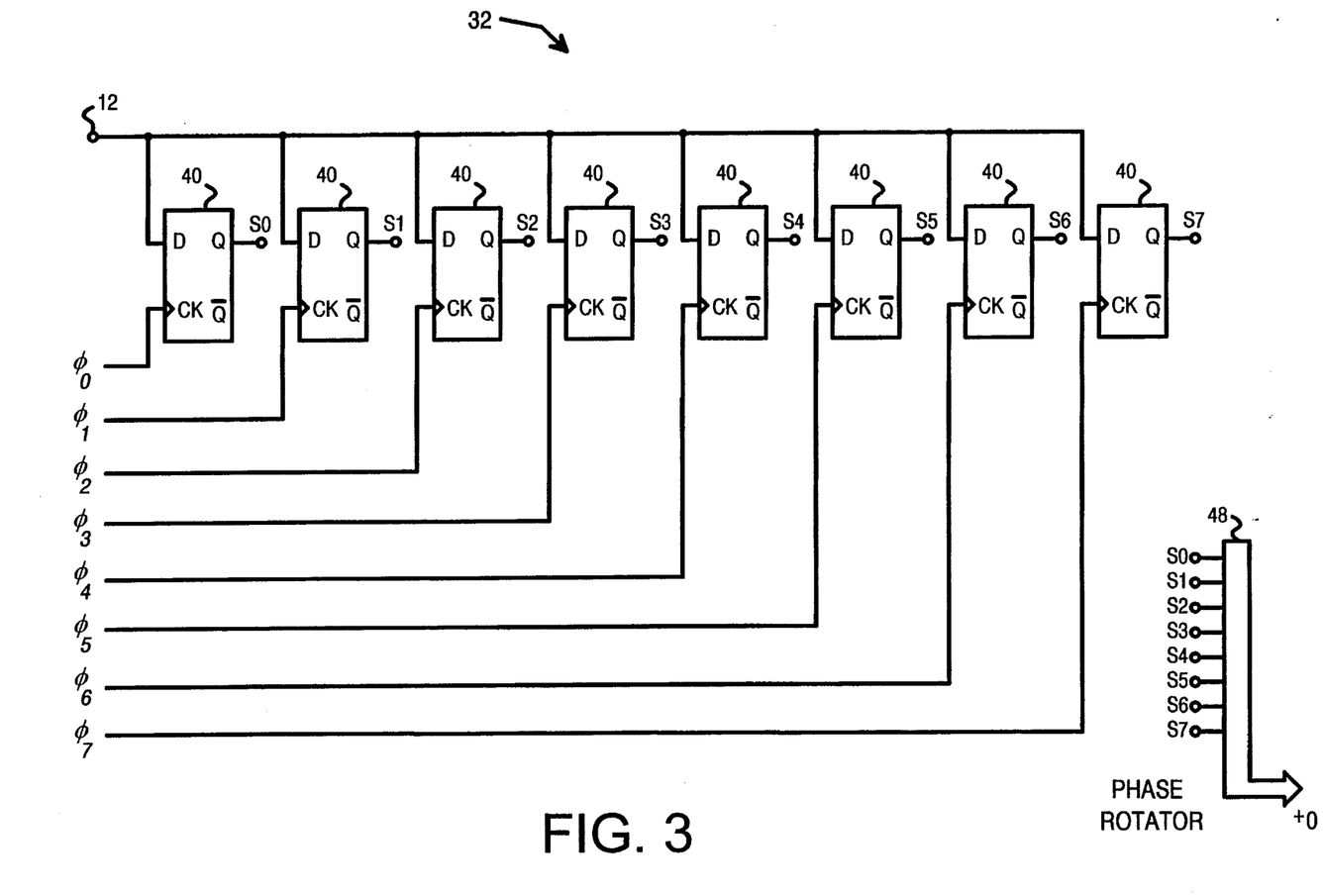
FIG. 3 shows a schematic representation of a snapshot sampler included within the inventive data recovery circuit.

FIG. 3 shows a schematic representation of the snap-shot sampler 32. As shown in FIG. 3, the clock phases $\phi_0$, $\phi_1$, $\phi_2$, $\phi_3$, $\phi_4$, $\phi_5$, $\phi_6$, $\phi_7$ each drive the clock (CK) input of identical D-type flip-flops 40. The Manchester data is supplied to each of the flip-flops 40 via the input line 12. In this manner, the Q outputs of the flip-flops 40 provide eight data samples S0, S1, S2, S3, S4, S5, S6 and S7 during each complete cycle through the phases of the clock generator 22.

Referring again to FIG. 1, the data samples S0, S1, S2, S3, S4, S5, S6 and S7, stored by the snap-shot sampler 32, are transmitted to a phase rotator 44 over a set of eight sampler output lines 48.

Figure 4:
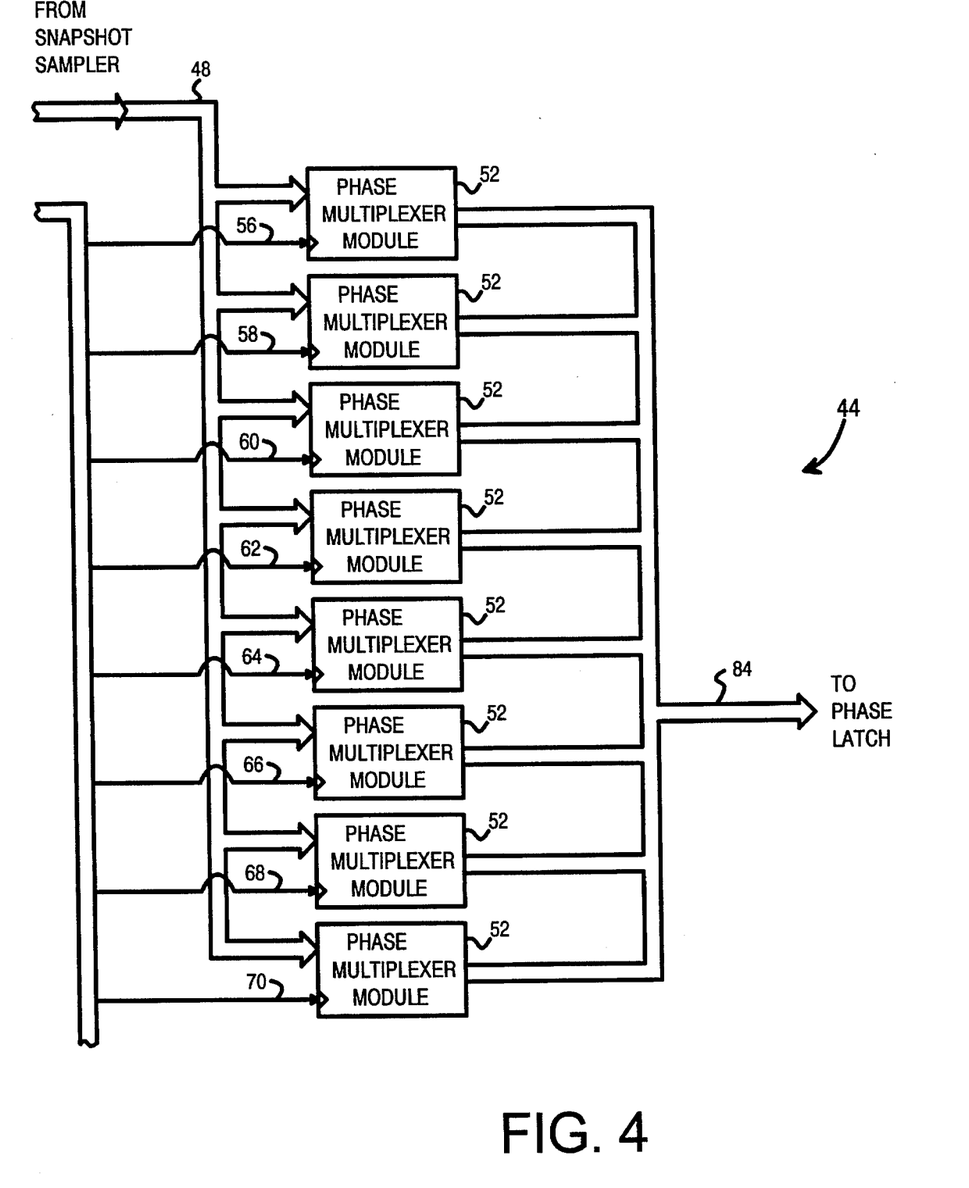
FIG. 4 is an illustrative block diagram of a phase rotator operatively connected to the snap shot sampler.

FIG. 4 is an illustrative block diagram of the phase rotator 44. As shown in FIG. 4, the phase rotator 44 includes eight identical phase multiplexer modules 52, each of which are addressed by the sampler output lines 48. Each multiplexer module 52 is separately actuated by first, second, third, fourth, fifth, sixth, seventh and eighth separate boundary select driver lines 56, 58, 60, 62, 64, 66, 68 and 70. For purposes of clarity the boundary select driver lines are shown as being incorporated within a boundary select driver bus 72 in communication with a phase decoder 74 (FIG. 1).

Figure 5:
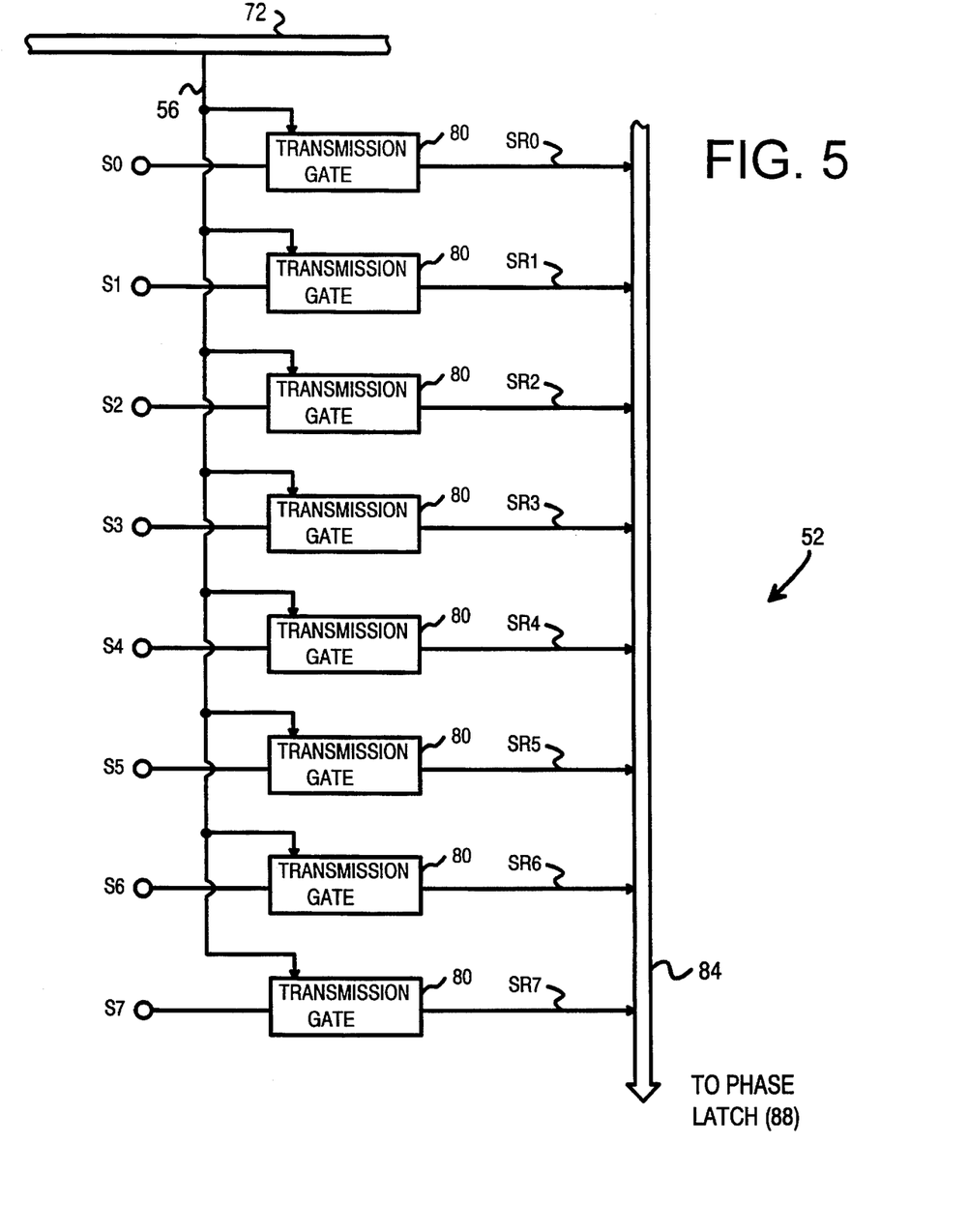
FIG. 5 shows a schematic representation of a first multiplexer module included within the phase rotator.

FIG. 5 shows a schematic representation of the first multiplexer module 52, it being understood that the remaining multiplexer modules are substantially identical thereto. The module 52 includes eight transmission gates 80, each of which are addressed by the first boundary select line 56. Upon being enabled by the select line 56, each of the gates 80 passes one of the data samples S0, S1, S2, S3, S4, S5, S6 and S7, thereby creating a set of eight rotated data samples SR0, SR1, SR2, SR3, SR4, SR5, SR6 and SR7. The rotated data samples SR0, SR1, SR2, SR3, SR4, SR5, SR6 and SR7 are forwarded by the gates 80 to eight separate signal lines (not individually shown) included within a phase rotator bus 84. The bus 4 is similarly coupled to the eight transmission gates within each of the multiplexer modules. Data rotation is simply performed by enabling the appropriate boundary select line 56, 58, 60, 62, 64, 66, 68 or 70. Only a single boundary select line is enabled at any given time. For example, when boundary select line 56 is enabled the first multiplexer 52 maps the data samples S0, S1, S2, S3, S4, S5, S6 and S7 to rotated data samples SR0, SR1, SR2, SR3, SR4, SR5, SR6 and SR7. Similarly, when boundary select line 58 is enabled the second multiplexer 52 maps the data samples S1, S2, S3, S4, S5, S6, S7 and S0 to rotated data samples SR0, SR1, SR2, SR3, SR4, SR5, SR6 and SR7.

Referring again to FIG. 1, the phase rotator bus 84 conducts the rotated data samples to a phase latch 88. The phase latch 88 is also addressed by first, second, third and fourth latch enable lines from the phase decoder 74.

Figure 6:
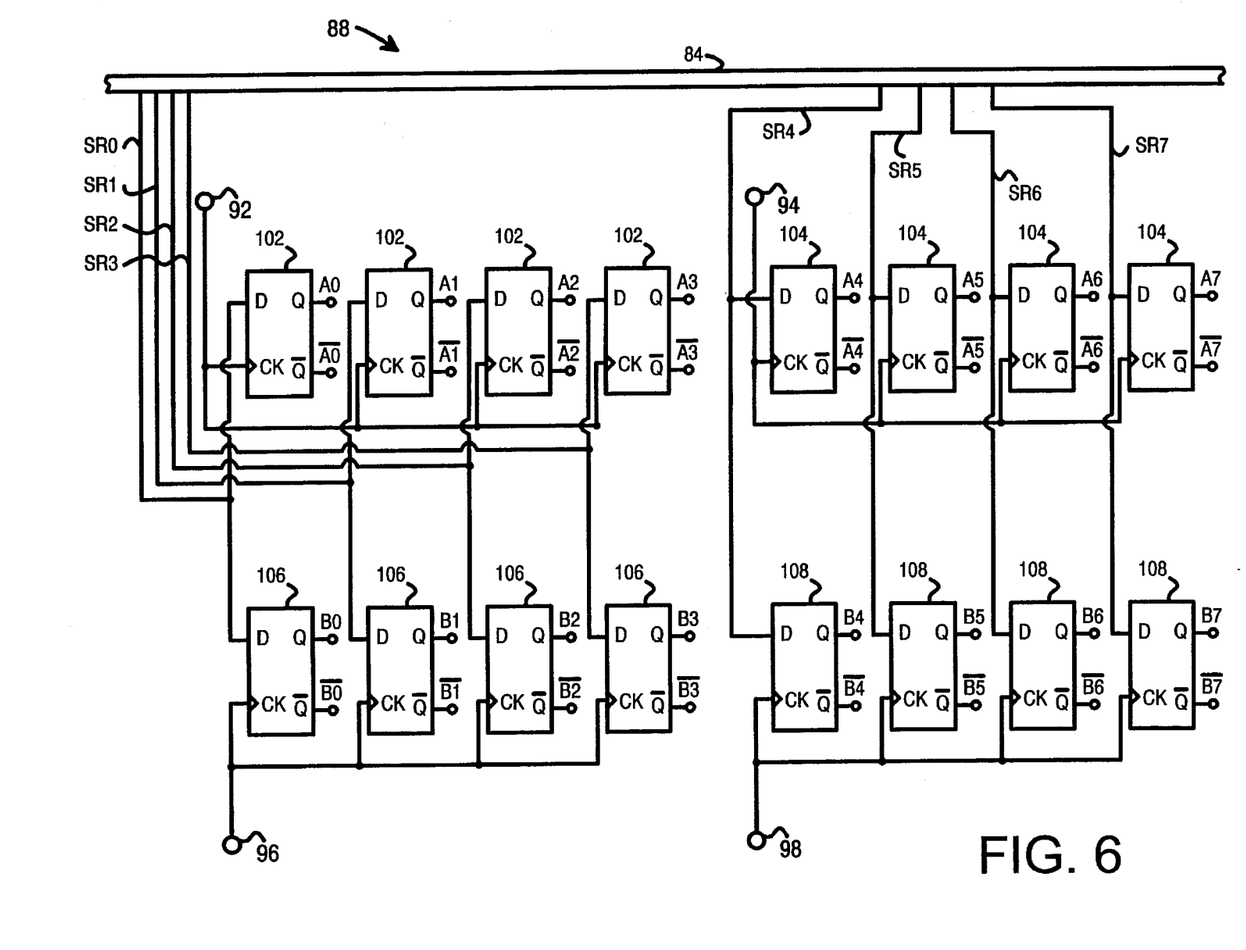
FIG. 6 shows a schematic representation of a phase latch network disposed to collect sets of sample data from the phase rotator.

FIG. 6 shows a schematic representation of the phase latch 88. The first, second, third and fourth latch enable lines 92, 94, 96 and 98 are used to clock first, second, third and fourth sets 102, 104, 106 and 108 of D-type latch flip-flops, respectively. As shown in detail in FIG. 6, the rotated data samples SR0, SR1, SR2 and SR3 are supplied to the first and third sets of flip-flops 102 and 106. Similarly, the rotated samples SR4, SR5, SR6 and SR7 are routed to the second and fourth sets of latch flip-flops 104 and 108. As shown in FIG. 6, reference symbols A0, A1, A2, A3, A4, A5, A6 and A7 serve to identify the Q output terminals of the first and second sets of latch flip-flops 102 and 104. In like manner the reference symbols B0, B1, B2, B3, B4, B5, B6 and B7 are employed to label the Q output terminals of the third and fourth sets of latch flip flops 106 and 108.

Figure 7:
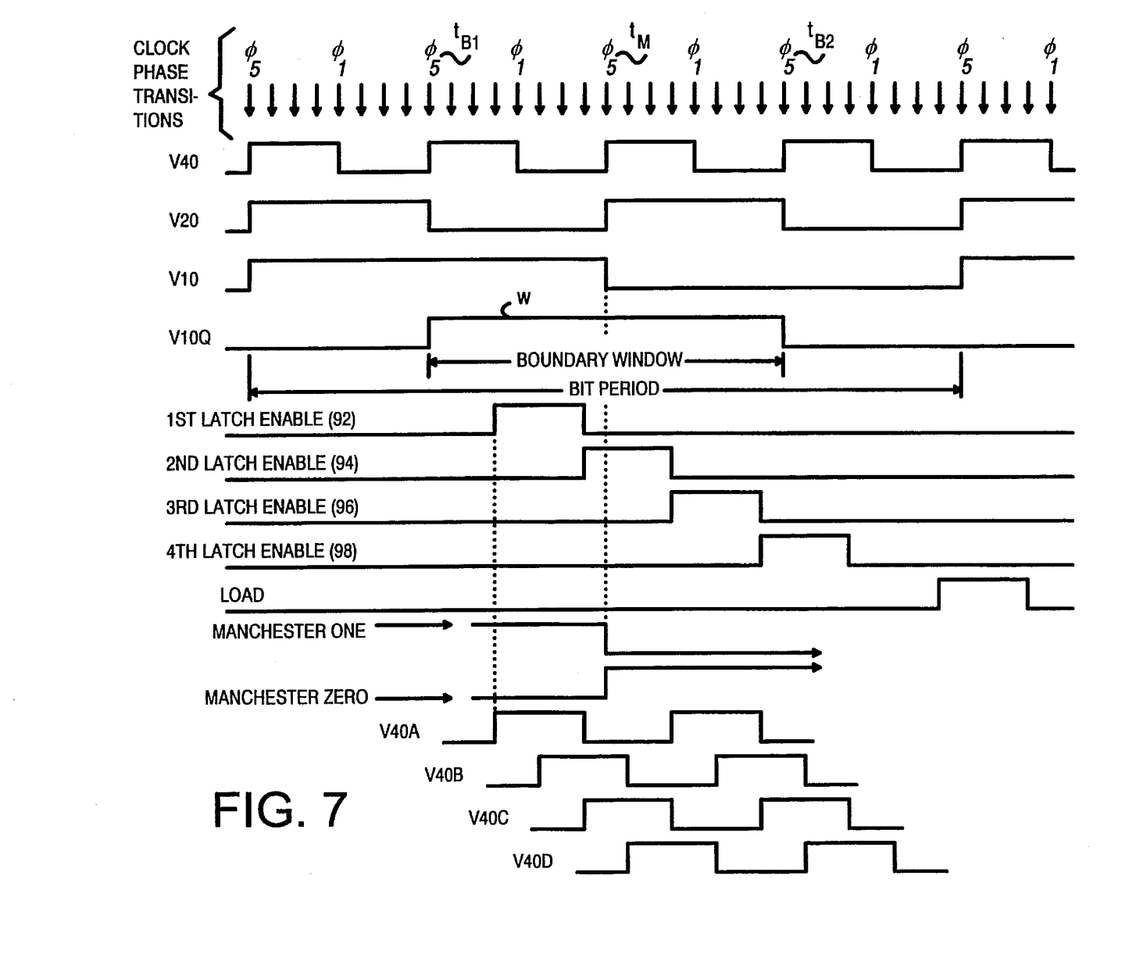
FIG. 7 is a timing diagram depicting the manner in which Manchester data impressed on an input line is latched by a set of flip-flops included within the phase latch.

FIG. 7 is a timing diagram depicting the manner in which Manchester data impressed on the input line 12 is latched by the flip-flops included within the phase latch 88. FIG. 7 shows the interlaced transitions of the 40 MHz clock phases $\phi_0$, $\phi_1$, $\phi_2$, $\phi_3$, $\phi_4$, $\phi_5$, $\phi_6$, and $\phi_7$ relative to 40 MHz, 20 MHz and 10 MHz square waves in synchrony with the clock phase $\phi_0$. The inventive circuit 10 operates to sample the input Manchester waveform within boundary sampling windows confined to the vicinity surrounding each midbit data transition. Specifically, the boundary window surrounding each midbit transition is defined by two periods of one of the eight clock phases $\phi_0$, $\phi_1$, $\phi_2$, $\phi_3$, $\phi_4$, $\phi_5$, $\phi_6$, and $\phi_7$, and in the particular example of FIG. 7 is defined by the logically high portion of a 90 degree phase-shifted (quadrature) version of the 10 MHz square wave denoted by V10Q. The particular clock phase selected to define the boundary window is that which includes a rising transition most closely aligned with the Manchester midbit transition. For example, in FIG. 7 the transitions in clock phase $\phi_5$ at times $t_{B1}$ and $t_{B2}$ define a 50 nanosecond boundary window W centered approximately about the midbit Manchester transition occurring at time $t_M$. As will be apparent from the following discussion, by modifying the phase of the selected 40 MHz clock signal, a boundary window nominally remains centered over each midbit transition in the 10 Mbps Manchester waveform. Hence, the waveform defined by shifting the boundary window by one-quarter period corresponds to a recovered clock signal phase-locked with the input Manchester data.

Referring again to FIG. 7, the input Manchester data is sampled during each of the indicated clock phase transitions. Boundary select line 72 determines at which particular clock transition within the boundary window that data will initially be read. Data samples are then accumulated by the sampler 32 synchronously with rising transitions in the sequential clock phases which follow the clock transition during which data is initially read. Again, since the boundary window W commences with clock phase $\phi_5$ the sixth boundary select line 66 is raised during transmission of the collected samples from the sampler 32 to the phase rotator 44. In this manner, the first sample accumulated by the sampler 32 is transformed into rotated data sample SR0 within the phase rotator 44, the second collected sample corresponds to the rotated sample SR1, and so on. The phase rotator 44 thus operates to order (i.e. rotate) the data samples S0, S1, S2, S3, S4, S5, S6 and S7 within the boundary window W. Again, the sequential arrangement of the data samples within the window W is determined by the particular boundary select driver line pulsed by the phase decoder 74.

As shown in FIG. 7, the first latch enable line 92 is raised by the phase decoder 74 in order to cause the first four rotated samples SR0, SR1, SR2 and SR3 to be latched by the first set of flip-flops 102 within the phase latch 88. Similarly, the first latch enable line 92 is lowered and the second latch enable line 94 is raised in order to latch the rotated samples SR4, SR5, SR6 and SR7 within the second set of phase latch flip-flops 104. Also at this time the second set of four accumulated data samples replace the first four accumulated samples within the multiplexer module 52. Next, at the third latch enable line 96 is raised by the phase decoder 74 in order to cause the first four rotated samples SR0, SR1, SR2 and SR3 to be latched by the third set of phase latch flip-flops 106. The third latch enable line 96 is then lowered and the fourth latch enable line 98 is contemporaneously raised. In this manner the rotated samples SR4, SR5, SR6 and SR7 of the are latched within the second set of phase latch flip-flops 104. This process continues until a total of sixteen data samples are stored in the phase latch 88. As shown in FIG. 1, the phase latch 88 is operatively connected to a phase encoder 110.

Figure 8A:
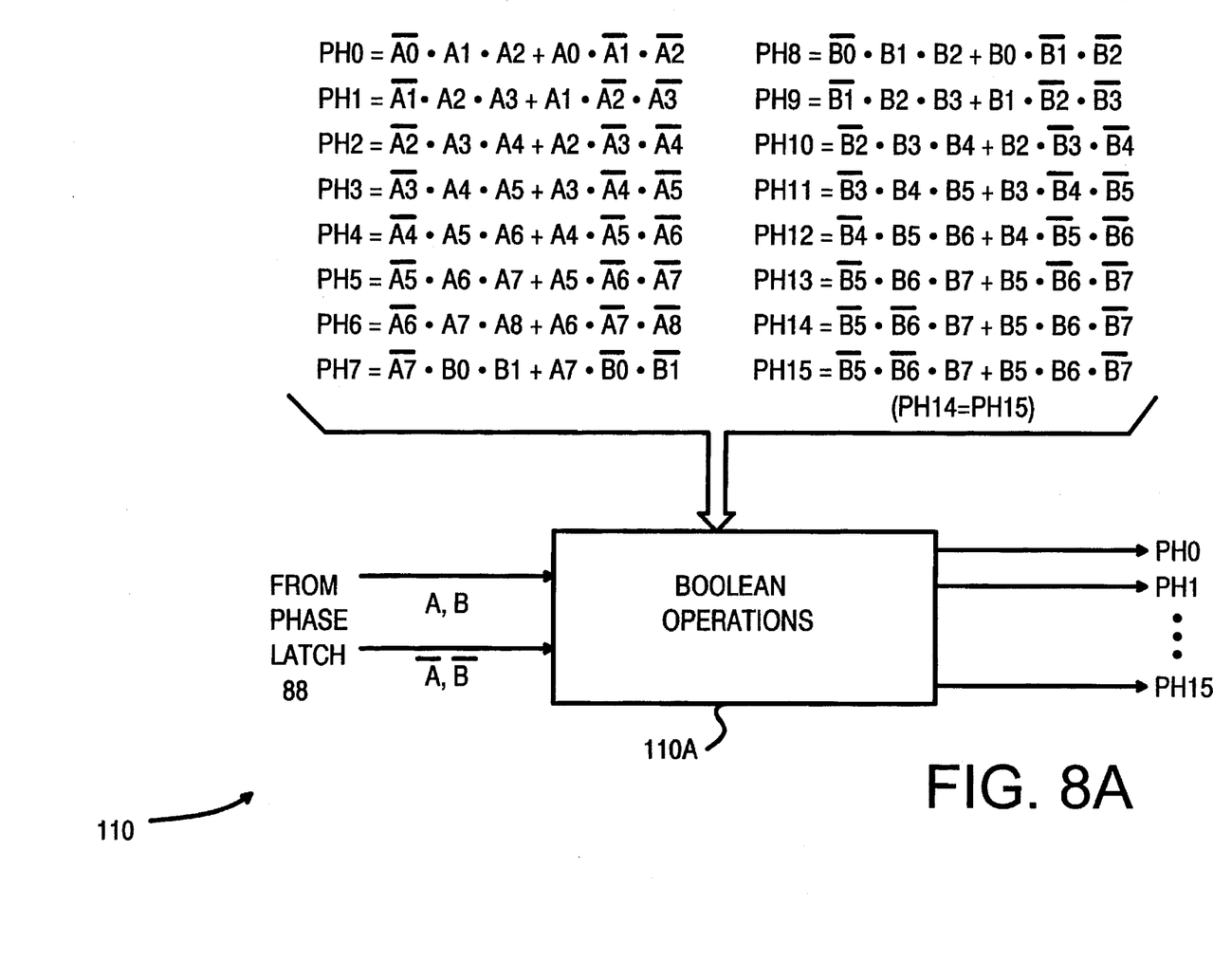
FIGS. 8a and 8b together yield a schematic representation of a phase encoder network operative to provide a stream of phase error signals.
Figure 8B:
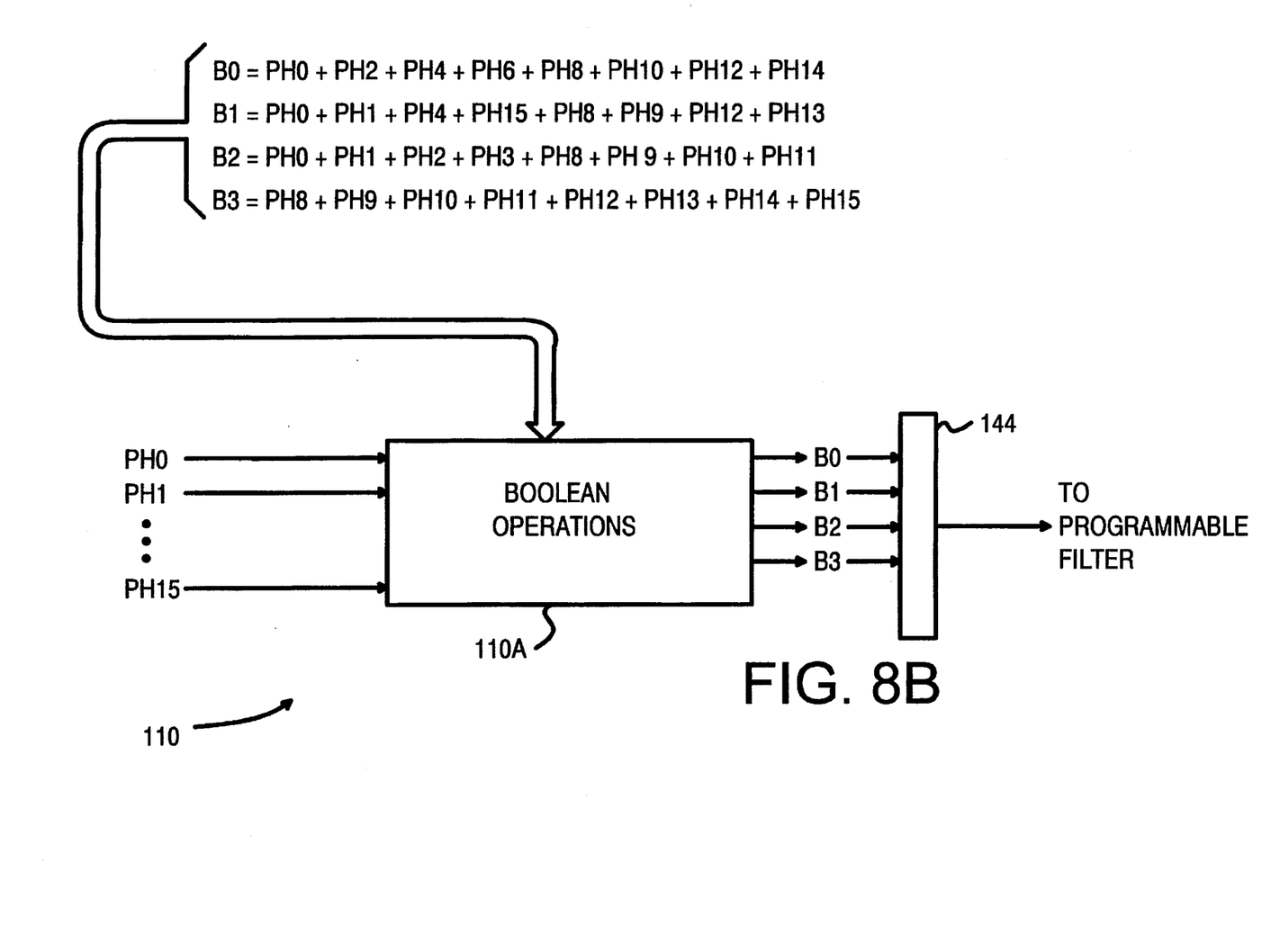

FIGS. 8a and 8b together depict the Boolean operations performed within the phase encoder 110. As shown in FIG. 8a, the phase encoder 110 includes a first Boolean network 110a driven by the Q output terminals of the latch identified by the indicated reference symbols (e.g. A0, A1, B0, B1) latch 88. The phase encoder 110 is disposed to estimate the phase differential between the midbit transition of the data signal and the corresponding transition within the recovered clock (FIG. 7). The logical output of the first Boolean network 110a maps the midbit data transition to any one of sixteen (i.e., PH0, PH1, . . . PH15) locations within the current boundary window.

More specifically, the latch 88 and phase encoder 110 are configured such that three consecutive data samples within the boundary window W forming the patterns "011" or "100" will cause one of the outputs of the network 110a to register a logical high. As shown in FIG. 8a, the outputs of the network 110a denoted by reference symbols PH0, PH1, PH2 PH3, PH4, PH5, PH6, PH7, PH8, PH9, PH10, PH11, PH12, PH13, PH14 and PH15 are indicative of the phase of the midbit transition relative to the boundary window W. For example, for a rising Manchester midbit transition at the far left of the boundary window a "011" data pattern is defined by A0=0, A1=1 and A2=1. This "011" data pattern induces PH0 to become true (i.e. $\overline{A0}$=1, A1=1 and A2=1). Similarly, a Manchester transition at the far right of the boundary window gives rise to the "001" or "110" data pattern registered by phase-indicating output PH15=1.

Referring to FIG. 8b, the phase encoder 110 includes a second Boolean network 110b for generating an error signal based on the logical status of the outputs PH0 through PH15 from the first Boolean network 110a. In particular, the second Boolean network 110b is operative to generate a 4-bit two's complement representation (B3,B2,B1,B0) of the phase information inherent in the signals PH0 through PH15. The two's complement error signal is transmitted to a programmable filter 140 over a set of filter driver lines generally indicated by reference numeral 144. The two's complement error signal represents the number of sample clock phases (FIG. 7) by which the Manchester data transition of interest leads or lags the center of the boundary window. Table I below summarizes the preceding discussion, with the CLOCK ERROR column representing the number of sample clock phases by which the Manchester transition leads (B3=0) or lags (B3=1) the center of the boundary window.

TABLE 1

| PHASE SIGNAL | TWO'S COMPLEMENT ERROR (B3, B2, B1, B0) | CLOCK ERROR |
|---|---|---|
| PH0 = 1 | 0111 | 7 |
| PH1 = 1 | 0110 | 6 |
| PH2 = 1 | 0101 | 5 |
| PH3 = 1 | 0100 | 4 |
| PH4 = 1 | 0011 | 3 |
| PH5 = 1 | 0010 | 2 |
| PH6 = 1 | 0001 | 1 |
| PH7 = 1 | 0000 | 0* |
| PH8 = 1 | 1111 | −1 |
| PH9 = 1 | 1110 | −2 |
| PH10 = 1 | 1101 | −3 |
| PH11 = 1 | 1100 | −4 |
| PH12 = 1 | 1011 | −5 |
| PH13 = 1 | 1010 | −6 |
| PH14 = 1 | 1001 | −7 |
| PH15 = 1 | 1000 | −8 |

*phase lock condition

Figure 9:
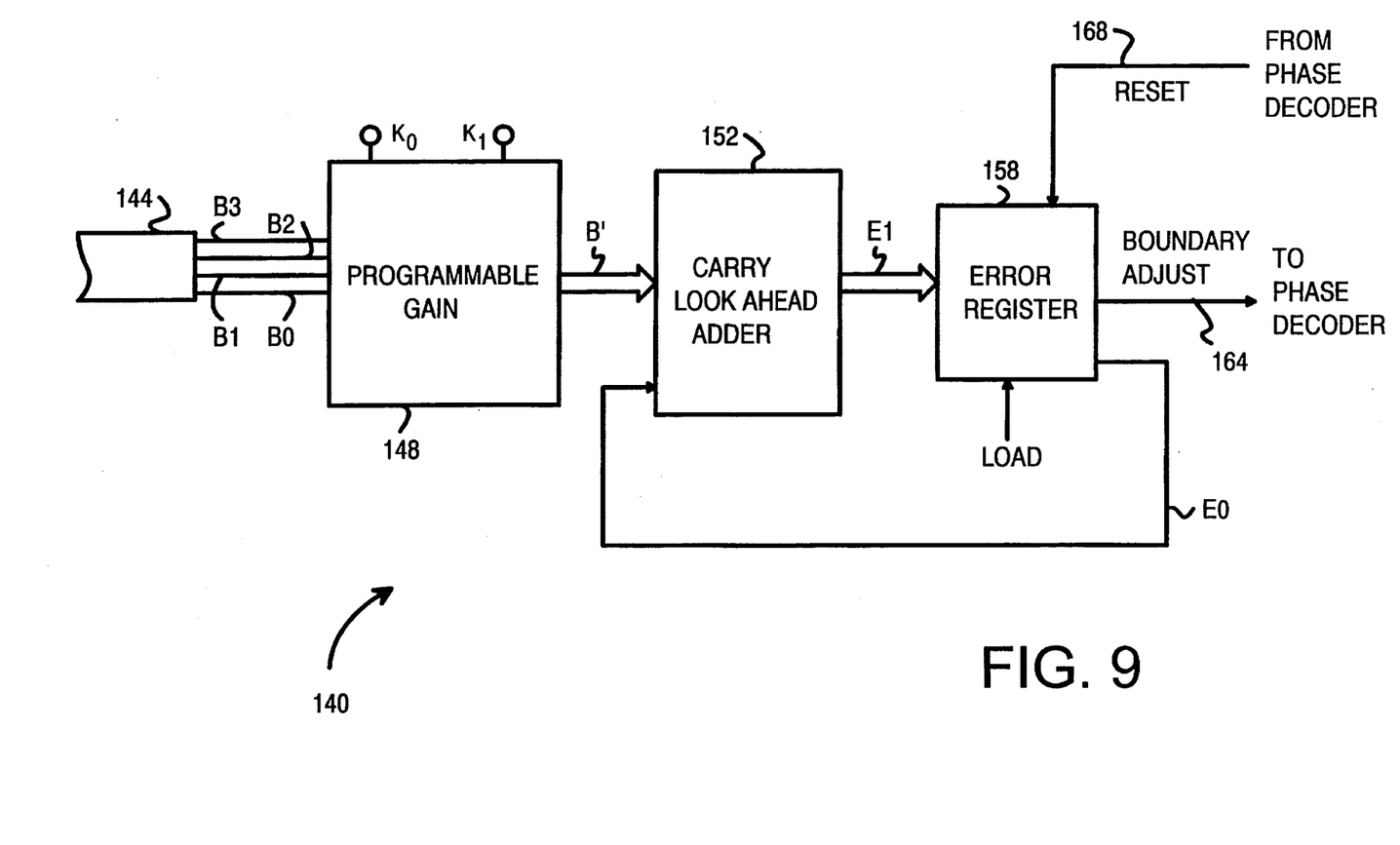
FIG. 9 is a block diagram of a programmable filter addressed by the phase encoder network.

FIG. 9a shows a block diagrammatic representation of a programmable filter 140. The filter 140 includes a programmable gain module 148 addressed by the two's complement error signal (B3, B2, B1, B0). The gain module 148 is designed to transform the two's complement error signal to a scaled error signal B' by performing a bit shift operation in accordance with a two-bit digital gain control word (K1, K0). Table 1 is a truth table representing the logical operations performed within the gain module 148. The truth table may be implemented in a straightforward manner by using, for example, an appropriate arrangement of transmission gates. By appropriately scaling the two's complement error signal the loop gain of the circuit 10 can be adjusted. A lower gain (i.e., K0=0, K1=0) is desired in cases where the input Manchester data is known to contain phase jitter, but is transmitted by a carrier relatively free of frequency modulation. A higher gain (i.e., K0=1, K1=1) allows the inventive PLL to more accurately track Manchester data having frequency-modulated carriers. As shown in FIG. 9, the scaled error signal is transmitted to a carry look ahead adder 152. The adder 152 combines the scaled error signal B' with an accumulated error E0 stored in error register 158. During each bit cycle, the value of the accumulated error E0 is replaced within register 158 by an updated error E1, wherein E1=E0+ B'. The accumulated error E0 is adjusted in this manner until the value thereof exceeds an upper correction threshold or drops below a lower correction threshold.

When the value of the accumulated error E0 crosses either of the correction thresholds in the aforementioned manner a FORWARD or REVERSE signal is transmitted by error register 158 to the phase decoder 74 via a boundary adjust line 164. For example, the upper threshold may be set at +16 and the lower threshold at −16. Upon the accumulated error E0 exceeding +16, a logical high corresponding to the FORWARD signal is impressed on boundary adjust line 164. Similarly, in the case of a REVERSE signal the boundary adjust line 164 is driven low when E0 drops below −16. Subsequent to receiving a FORWARD or REVERSE signal the phase decoder resets the register 158 by pulsing reset line 168. For example, with a gain of unity (i.e, Ki=0, K0=0) and the thresholds set at +/−16, it will take sixteen bit cycles for the appropriate correction to be effected if the Manchester midbit of interest leads or lags the center of the boundary window by one clock phase. Similarly, with a gain of two (i.e., Ki=0, K0=i), the desired adjustment will be completed within eight bit cycles.

The FORWARD and REVERSE signals instruct the phase decoder 74 to select a different clock phase to define the rising edge of the boundary window. The decoder implements this function by actuating the boundary select line associated with the clock phase which leads or lags the currently selected clock phase by a predefined number of phases. For example, assuming $\phi_1$ to be the currently selected clock phase the decoder 74 may be realized so as to change the selected clock phase from $\phi_1$ to $\phi_0$ upon receiving a FORWARD signal. Again, the decoder 74 would perform this function by raising boundary select line 56 and lowering select line 58. In this manner, the filter 140 and decoder 74 operate to average the stream of error signals generated by the phase encoder 110 by performing a correction only after an accumulated phase deviation is detected. This feature of the present invention reduces sensitivity to spurious noise energy since uncorrelated phase deviations are not aggregated within the filter 140.

Figure 10A:
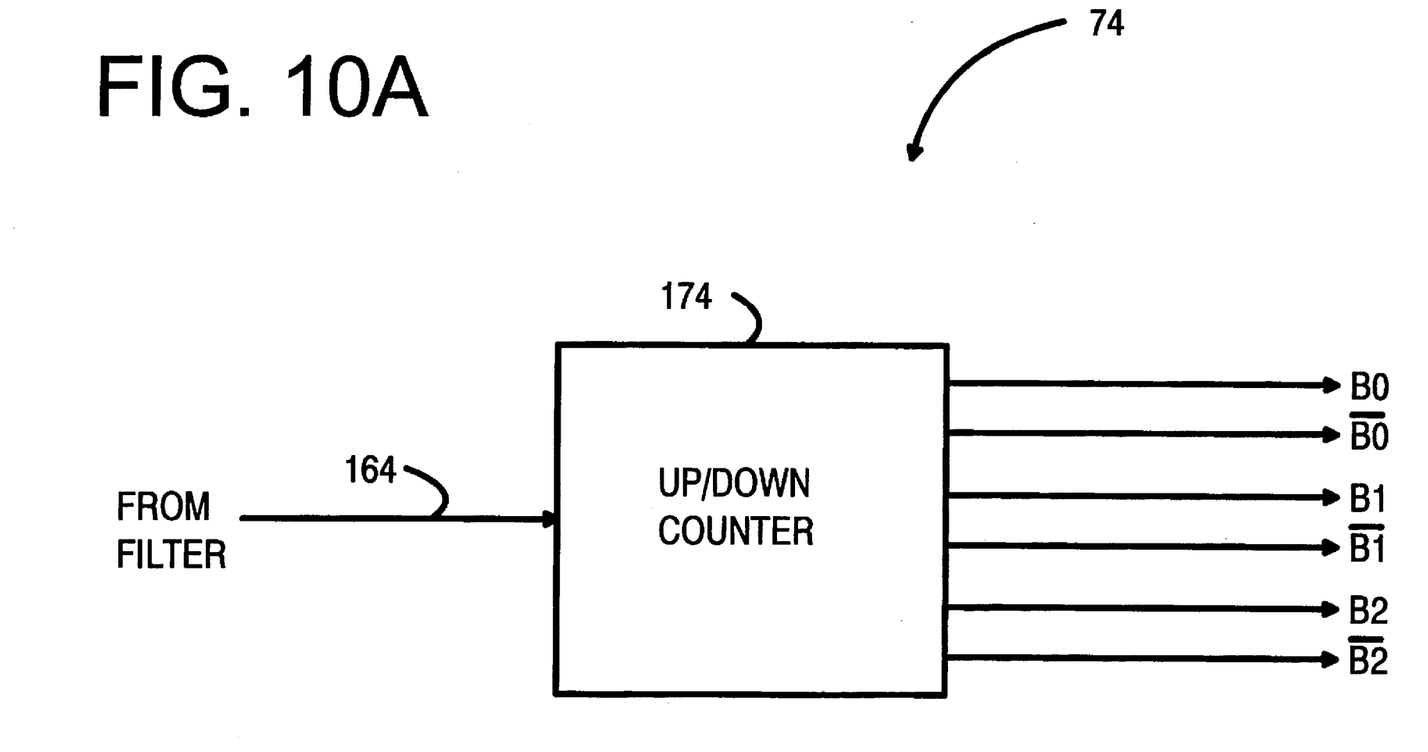
FIGS. 10a, 10b and 10c show a schematic representation of a phase decoder included within the inventive data recovery circuit.
Figure 10B:
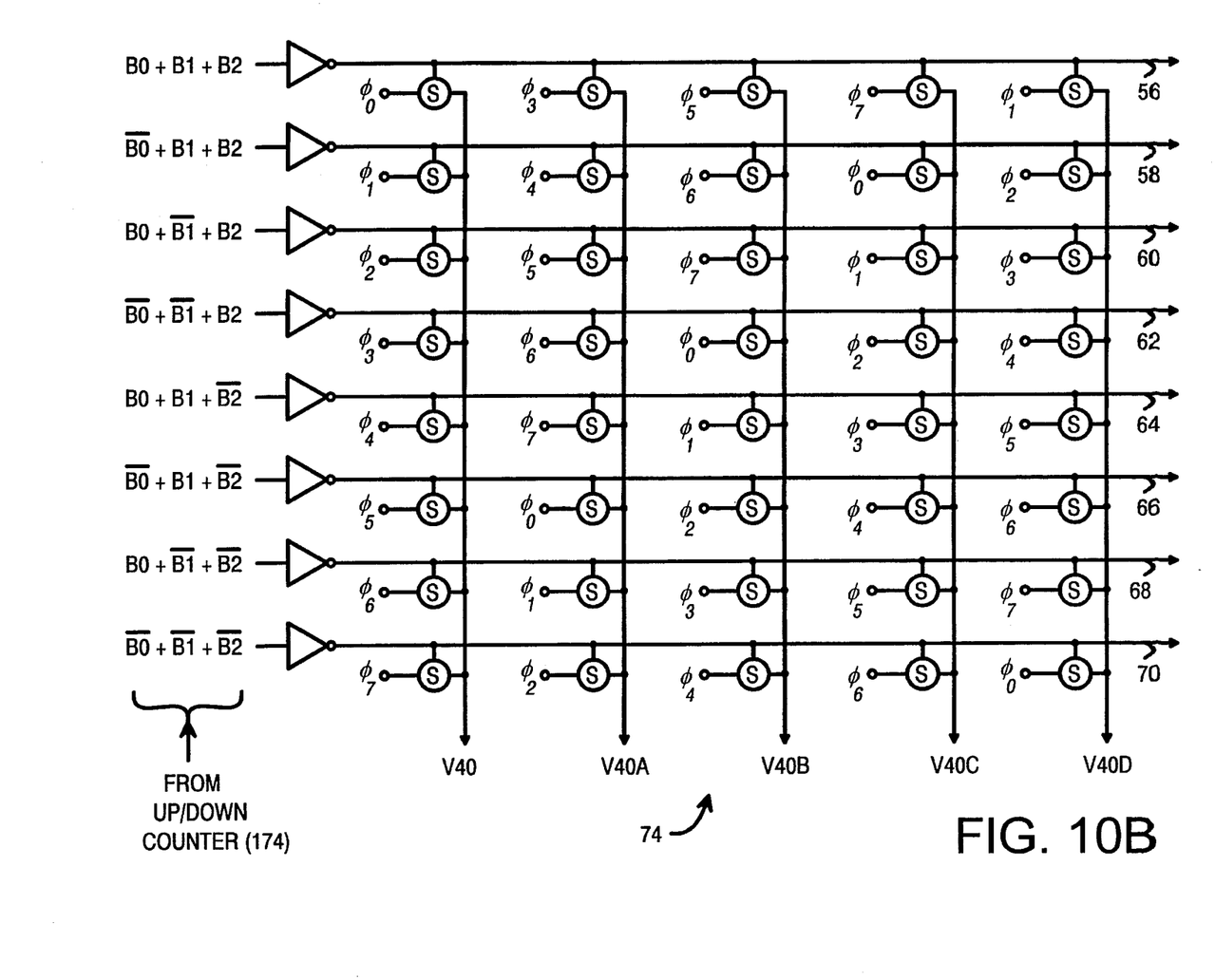
Figure 10C:
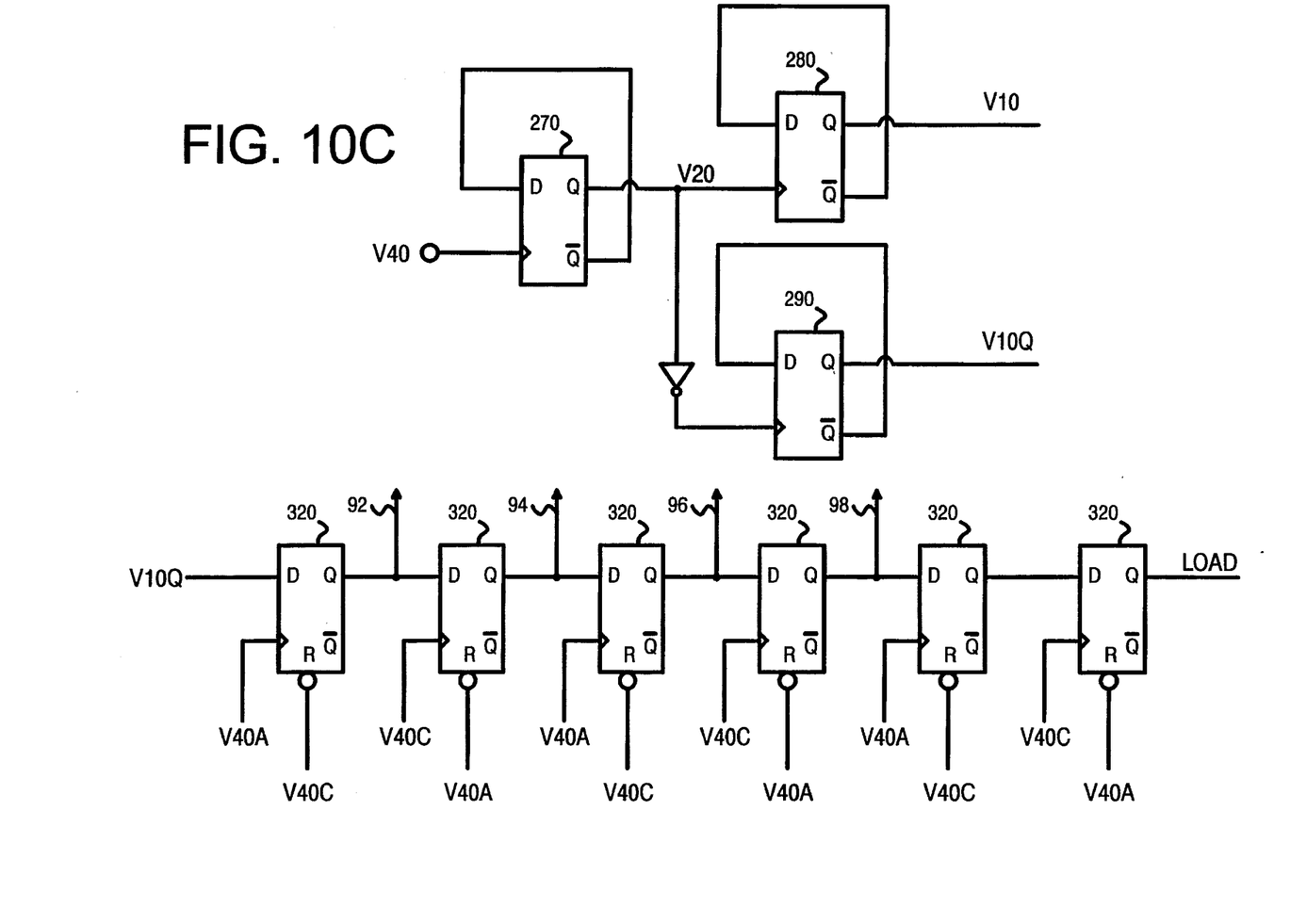

FIGS. 10a, 10b and 10c show a schematic representation of the phase decoder 74. The decoder 74 includes an UP/DOWN counter 174 (FIG. 10a) addressed by boundary adjust line 164. The counter 174 decrements or increments the selected clock phase associated with the first bit of the boundary window in response to FORWARD or REVERSE signals, respectively, impressed on boundary adjust line 164. The numerical value of the selected clock phase (i.e. 0, 1, 2, 3, 4, 5, 6, or 7) is furnished by the counter 174 to select line driver logic 178 in a 6-bit representation (B0, B0*, B1, B1*, B2, B2*).

Referring to FIG. 10b, V40 corresponds to the 40 MHz clock signal from which the 10 MHz recovered clock signal generated by the inventive data recovery circuit 10 is derived. The phase of the clock signal V40 varies in accordance with the indicated combinations of the clock phase bits B0, B0*, B1, B1*, B2, B2* provided by the UP/DOWN counter 174 and clock phases $\phi_0$, $\phi_1$, $\phi_2$, $\phi_3$, $\phi_4$, $\phi_5$, $\phi_6$, $\phi_7$. In particular, the phase decoder 74 includes an arrangement of inverters 230 addressed by B0, B0*, B1, B1*, B2, B2*, and further includes transmission gates 240 responsive to the indicated clock phases. The phase of the clock V40 is adjusted by adding a delay between successive transitions in the waveform V40 in response to a FORWARD signal, and by decreasing the interval between successive transitions in the waveform V40 in response to a REVERSE signal. FIG. 10b also shows the manner in which four additional 40 MHz clock phases V40A, V40B, V40C and V40D (see also FIG. 7), as well as the boundary select signals impressed on lines 56, 58, 60, 62, 64, 66, 68 or 70, are synthesized from the arrangement of inverters 230 and transmission gates 240.

Referring to FIG. 10c, the phase decoder 74 includes first, second and third decoder flip-flops 270, 280 and 290 for generating the 10 MHz recovered clock signal V10 and the quadrature (90 degree phase-shifted) version V10Q thereof. As shown in FIG. 10c, clock signal V40 addresses the first decoder flip-flop 270 while clock signal V20 addresses the second decoder flip 280. Signal V20 is inverted by a decoder inverter 300 and applied to the third decoder flip-flop 290. FIG. 7 indicates that the falling transitions of the 20 MHz clock are in phase with the edges of the boundary window, and hence also coincide with the currently selected clock phase (e.g., $\phi_5$). FIG. 10c also depicts the manner in which the latch enable signals impressed on lines 92, 94, 96 and 98 are derived from V10Q by a set of latch enable flip-flops 320 driven by the waveforms V40A and V40C. A LOAD (FIG. 7) signal is used to update the error register 158 (FIG. 9) at the conclusion of each bit cycle (i.e., every 100 nsec.). The value of the Manchester data sampled during the falling edge of V20 determines whether the recovered Manchester data is locked in phase with the recovered 10 MHz clock, or is shifted 180 degrees relative therefrom (FIG. 7).

It is noted that the inventive data recovery circuit 10 may be initialized by a phase start module (not shown) in response to a preamble preceding each packet of input Manchester data. Such a preamble will include a predefined set of transitions which enable the recovery circuit 10 to ascertain the location of the leading edge of the input Manchester data. The clock phase closest to the midbit transition of the first bit of Manchester data is loaded into the UP/DOWN counter 174 as an initial phase estimate. This also allows appropriate initialization of the clocks V10, V10Q and V20. The phase start module is disabled subsequent to initialization of the phase decoder 74.

While the present invention has been described herein with reference to a particular embodiment, it is understood that the invention is not limited thereto. The teachings of this invention may be utilized by one having ordinary skill in the art to make modifications within the scope thereof. For example, in alternative embodiments of the present invention it may be desired to utilize logical networks other than those disclosed herein in realizing the phase decoder and phase rotator circuits. Similarly, differing implementations of the filter may be used to average the stream of error signals produced by the phase encoder. In addition, the teachings of the present invention are not exclusively applicable to sequences of Manchester data. The preferred embodiment described herein may be altered by those skilled in the art to be responsive to other data formats.

It is therefore contemplated by the appended claims to cover any and all such modifications.

Accordingly,

What is claimed is:

1. A digital phase-locked data recovery circuit comprising:

means for receiving a data signal;

multi-phase clock means for supplying clock signals having a predetermined relative phase relationship, said multi-phase clock means including a plurality of circuit nodes for providing a set of said clock signals at a first frequency and equally phase-offset from each other;

snap shot sampling means for taking samples of said received data signal in response to said clock signals, said samples being taken within a boundary window centered approximately about a midbit transition of said data signal;

means for comparing said samples with a sample pattern, said comparing means including phase encoder means for generating a plurality of error signals in response to said comparison; and said comparing means further including filter means for accumulating said plurality of error signals and for generating FORWARD/REVERSE signals when the accumulated plurality of error signals crosses a correction threshold and phase decoder means coupled to said filter means for providing boundary select signals synchronized in phase with said clock signals, said boundary select signals being adjusted by said phase decoder means in accordance with said FORWARD/REVERSE signals.

2. The phase-locked data recovery circuit of claim 1 wherein said comparing means further includes phase rotator means coupled to the snap shot sampling means for adjusting said samples included within said boundary window.

3. The data recovery circuit of claim 2 wherein said comparing means further includes phase latch means coupled to said phase rotator means for latching said samples taken during predefined intervals within said boundary window.

4. The data recovery circuit of claim 3 wherein said phase encoder means includes error code logic for synthesizing bits of said error signals in response to said latched data samples.

5. The data recovery circuit of claim 4 wherein said filter means includes:

a programmable gain stage for adjusting the magnitude of said error signals and an accumulator for adding a last received error signal to an aggregated error value.

6. The data recovery circuit of claim 5 wherein said filter means further includes:

a register for storing said aggregated error value, said register including decisional logic for issuing said FORWARD REVERSE signals based on the magnitude of said aggregated error value relative to first and second detection thresholds, respectively, and a feedback path for supplying said aggregated error value to said accumulator.

7. The data recovery circuit of claim 6 wherein phase decoder means includes:

a counter disposed to be decremented by said FORWARD signal and incremented by said REVERSE signal and boundary select logic for actuating said boundary select lines in response to the value of said counter in order to generate said boundary select signals.

8. The data recovery circuit of claim 7 wherein said snap shot sampling means includes an array of flip-flops for storing said data samples, each of said flip-flops being driven by one of said multi-phase clock signals.

9. The data recovery circuit of claim 8 wherein said phase rotator means includes first and second phase multiplexer modules, said first and second modules being addressed by said array of flip-flops and clocked by first and second boundary select lines of said boundary select lines, respectively.

10. The data recovery circuit of claim 9 wherein said first phase multiplexer module includes an array of transmission gates, each of said transmission gates being coupled to one of said flip-flops and to said first boundary select line.

11. The data recovery circuit of claim 1 wherein said phase decoder means includes:

a counter disposed to be decremented by said FORWARD signal and incremented by said REVERSE signal, boundary select logic for actuating said boundary select lines in response to the value of said counter in order to generate said boundary select signals, a local clock generator operatively coupled to said boundary select lines, and a frequency divider connected to said local clock generator.

12. A phase-locked loop method for recovering the phase of a data signal comprising the steps of:

a) supplying a set of clock signals having a predetermined relative phase relationship, said step further including the step of providing said set of said clock signals at a first frequency, each of said clock signals within said set being equally offset in phase from each other;

b) sampling said data signal in response to said clock signals to provide a plurality of data samples, said data samples being taken within a boundary window centered approximately about a midbit transition of said data signal;

c) comparing said data samples with a sample pattern, said comparing step further including the steps of:

$c_1$) generating a plurality of error signals in response to said comparison;

$c_2$) accumulating said plurality of error signals; and $c_3$) generating a FORWARD/REVERSE signal when the accumulated plurality of error signals crosses a correction threshold; and d) adjusting the phase of said boundary window in response to said plurality of error signals wherein said step of comparing further includes the step of providing a boundary select signal for synchronizing the phase of said boundary window with the phase of one of said clock signals, said boundary select signal being adjust in accordance with said FORWARD/REVERSE signal.

13. A digital phase-locked data recovery circuit comprising:

means for receiving a data signal;

multi-phase clock means for supplying clock signals having a predetermined relative phase relationship, said multi-phase clock means including a plurality of circuit nodes for providing a set of said clock signals at a first frequency and equally phase-offset from each other;

snap shot sampling means for taking samples of said received data signal in response to said clock signals, said samples being taken within a boundary window; and means for comparing said samples with a sample pattern, said comparing means including phase encoder means for generating a plurality of error signals in response to said comparison; said comparing means further including a filter means coupled to said phase encoder means and a decoder means coupled to said filter means operating to average said plurality of error signals generated by said phase encoder by performing a phase correction after a phase deviation in the samples is detected.

* * * * *